United States Patent [19]

Fayfield

[11] Patent Number: 5,777,557
[45] Date of Patent: *Jul. 7, 1998

[54] BINARY SENSOR WITH DIAGNOSTIC SIGNAL SUPERIMPOSED ON BINARY OUTPUT

[75] Inventor: Robert W. Fayfield, Excelsior, Minn.

[73] Assignee: Banner Engineering Corporation, Minneapolis, Minn.

[*] Notice: The term of this patent shall not extend beyond the expiration date of Pat. No. 5,644,730.

[21] Appl. No.: 586,487

[22] Filed: Jan. 16, 1996

[51] Int. Cl.$^6$ ................................................. G06F 13/40
[52] U.S. Cl. ........................... 340/635; 340/644; 395/282
[58] Field of Search ............................. 340/635, 619, 340/694; 395/282, 283

[56] References Cited

U.S. PATENT DOCUMENTS

| | | | |
|---|---|---|---|
| 4,356,393 | 10/1982 | Fayfield | 250/221 |
| 4,965,548 | 10/1990 | Fayfield | 340/511 |
| 5,087,838 | 2/1992 | Fayfield | 326/9 |
| 5,254,846 | 10/1993 | Fayfield | 250/205 |
| 5,644,730 | 7/1997 | Fayfield | 340/619 |

*Primary Examiner*—Edward Lefkowitz
*Attorney, Agent, or Firm*—Merchant, Gould, Smith, Edell, Welter & Schmidt, P.A.

[57] ABSTRACT

A binary sensor has a device for detecting the presence or condition of an object. The sensor has circuitry connected to the detecting device to generate a binary output signal that represents the presence or condition of the object. The sensor also includes circuitry that generates a diagnostic signal associated with the sensor. The diagnostic signal is superimposed on the binary output signal. The binary output signal with the superimposed diagnostic signal are simultaneously transmitted to a controller such as a Programmable Logic Controller or a smart drop in a bus network. The diagnostic signal is designed so that it will not interfere with the ability of the controller to recognize the binary output. The controller may be provided with circuitry to detect and interpret the diagnostic signal.

6 Claims, 3 Drawing Sheets

TIMING DIAGRAMS 5,777,557

1

BINARY SENSOR WITH DIAGNOSTIC SIGNAL SUPERIMPOSED ON BINARY OUTPUT

BACKGROUND OF THE INVENTION

1. Field of the Invention

The present invention relates to binary sensors, particularly solid-state sensors in which the output is a binary signal (on or off). Such sensors can be photoelectric, inductive, ultrasonic or capacitive. The purpose of each of these four types of binary sensors is generally to sense the presense or condition of an object. The present invention relates in particular to a binary sensor having a diagnostic signal superimposed on the sensor binary output.

2. State of the Prior Art

Each of the four binary sensors described above utilize different principles to sense objects; however, all are similar in their output characteristics. An output common to all types is a semiconductor which is either fully on (conducting) or fully off (non-conducting), depending upon whether or not the object or condition has been sensed. The sensors typically have either NPN output transistors (sinking outputs), or PNP output transistors (sourcing outputs), or AC output devices such as thyristors or field effect transistors (FETs) sometimes combined with full wave rectifiers.

In the past such binary sensors have been wired to Programmable Logic Controllers which function, for example, to control a machine based upon inputs from binary sensors, limit switches, contact closures and other binary devices.

The input circuits of PLCs have been designed to be immune to transient signals. One technique for providing transient signal immunity is to design a switching level or signal threshold for the PLC that is midway between the highest and lowest signal input voltage expected from the binary sensor. If, for example, the sensor has a PNP sourcing output, and is operated from a 24 volt DC power supply, the sensor's output signal alternates between 0 volts DC and +24 volts DC. If the PLC input threshold is set at about 12 volts (or about one-half the sensor's supply voltage), there is 12 volts of "noise immunity" regardless of whether the sensor output is high (conducting) or low (nonconducting).

In some applications there are a large number of sensor inputs and loads used with the PLC. There is an associated high cost of wiring the sensors and loads to the PLC. Accordingly there has been an increasing use of "bus" systems in which a single communications channel is used to link many devices together. Such systems are well known in the prior art and have been identified under the trade names "Device Net", "SDS", "Seripelx", "ASI", "LON", "Profibus", and "Interbus". The electronics for converting the binary sensor output into a format compatible with a bus system can be installed in the sensor itself. See, for example, co-pending U.S application Ser. No. 08/409,262 filed Mar. 22, 1995, and entitled "Dual Mode Binary Sensor for Bus Operation", the disclosure of which is incorporated herein by reference. Installing the bus interface in the sensor has advantages, and, in particular, provides the ability to put diagnostic information about the operation of the sensor on the bus along with the information that represents the binary state of the sensor. One item of diagnostic information is the actual amplitude of the signal that represents the parameter being measured by the sensor. This information tells the user not only whether an object or condition is present, but also how close or how far away the object is to the sensor and whether the signal is degrading due to ambient conditions.

2

Another diagnostic signal may be referred to as the Excess Gain of the sensor when the sensor operates on photoelectric principles. This characteristic is the amplitude of the signal representing the received light compared to the amplitude required to change the state of the binary output. For further discussion and explanation see U.S. Pat. No. 4,356,393 entitled "Alignment Indicator for Photoelectric Scanners" the disclosure of which is incorporated herein by reference.

In the case of sensors having a bus interface built into the sensor itself, the signal that represents, for example, amplitude or Excess Gain may be easily converted to a serial bus data format and transmitted over the bus network. There are many situations, however, in which the bus interface cannot be integrated into the sensor because of space limitations. For these applications most of the bus hardware manufacturers offer remote interface modules, often referred to as "drops", which contain the bus interface electronics. One or more standard binary sensors can then be connected to these "smart drops", and the drops are connected to the bus cable that eventually terminates at a PLC or other computerized controller.

In prior art applications utilizing a smart drop there must be at least one additional wire from the binary sensor to the drop in order for the drop to transmit diangostic information. The additional wire contains the diagnostic information about the condition of the sensor. See U.S. Pat. Nos. 4,965,548 and 5,087,838 for examples of binary sensors with transmission of alarm (diagnostic) signals by means of separate wires. Although the requirement of an extra wire for transmitting diagnostic information about the sensor condition is a cost concern, a more significant disadvantage has resulted from the development of a defacto standard for binary sensor outputs, wire colors, connector styles and arrangements. For example, most binary sensors are three wire devices. For a DC sensor, a brown lead is used for the positive supply voltage, a blue lead for the negative supply voltage, and a black wire for the sensor binary output. If there is a fourth wire associated with the sensor it is white and usually carries a second output which is the complement (opposite logic) to the primary output. Therefore, if a signal representing, for example, the excess gain or alignment of a photoelectric sensor were used as the second output, it would not comply with the defacto standard, and the sensor containing this extra output quite likely could not be connected to a drop manufactured by a third party.

The present invention provides a solution to this problem by superimposing the diagnostic signal on the binary output wire. This eliminates the need for an extra wire carrying the diagnostic signal from the sensor to the PLC or the smart drop. The sensor of the present invention is thus compatible with the defacto standards. The diagnostic signal that is superimposed on the binary output of the sensor can be used or ignored as desired.

SUMMARY OF THE INVENTION

The present invention is a binary output sensor having a circuit means for generating a diagnostic signal and a circuit means for superimposing the diagnostic signal on the binary output signal. The diagnostic signal is superimposed on the binary output so that the diagnostic signal will not interfere with the conventional interface of the sensor to a PLC, a smart bus drop, or any other electronic device that depends on the binary sensor output as its input.

In the preferred embodiment the diagnostic signal that is superimposed on the binary output has an amplitude that is a fraction of the amplitude of the binary output representing the logic high state and the logic low state. For example, with respect to a PLC or drop operating at 24 VDC using 24 VDC binary sensors as inputs, the PLC or drop will have an input voltage threshold of about 12 volts DC. If the diagnostic signal superimposed on the binary sensor output is limited to one volt, the diagnostic signal will not interfere with the PLC's or drop's ability to determine whether the sensor output is in the logic high state (above about 12 volts DC) or in the logic low state (below about 12 volts DC).

The superimposed diagnostic signal may be an oscillation of some varying frequency in which the frequency represents the amplitude of the parameter being measured. See, for example, U.S. Pat. No. 4,356,393. The superimposed diagnostic signal may also be a serial digital data stream that represents whatever type data the sensor manufacturer wishes to transmit. As mentioned, the present invention may be connected directly to a PLC or may be connected to a bus drop. By superimposing the diagnostic signal on the binary output the need for a separate diagnostic wire output is eliminated and the sensor satisfies the defactor standards that have been developed for such sensors and the connection of such sensors to bus networks. These and other advantages of the invention will become apparent with reference to the accompanying drawings, detailed description of the preferred embodiment, and claims.

DETAILED DESCRIPTION OF THE PREFERRED EMBODIMENT

Figure 1:
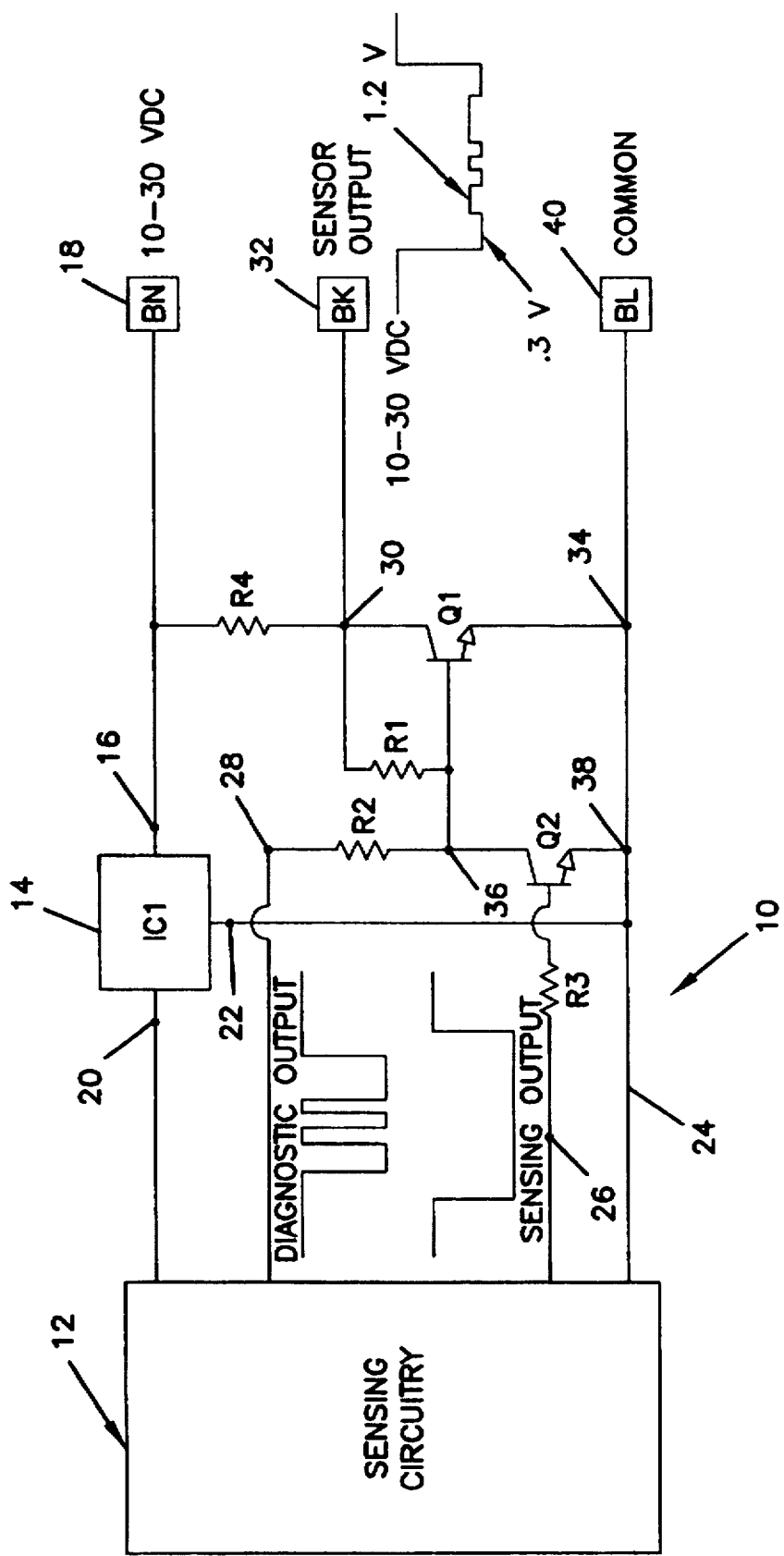
FIG. 1 is an electrical schematic diagram illustrating the preferred embodiment of the binary sensor of the present invention.

Referring to the drawings, a binary sensor 10 of the present invention is illustrated in FIG. 1. Sensor 10 may operate under either photoelectric, inductive, ultrasonic, or capacitive principles, or any other principle that results in a binary output including combinations of any of the above. Sensor 10 has sensing circuitry represented by the block 12 in FIG. 1. Circuitry 12 may be designed according to any one of well known prior art principles to sense the presence or condition of an object. Examples of sensing circuitry well known in the prior art are shown in U.S. Pat. Nos. 4,356,393; 4,965,548 and 5,087,838 the disclosures of which are incorporated herein by reference. A voltage regulator 14 has an input at node 16 which is connected to sensor input terminal 18. A 10–30 volt DC input supply voltage is provided at sensor input terminal 18. Voltage regulator 14 converts the 10–30 volt DC supply at node 16 to a regulated 5 volts DC (for example) at an output node 20. The regulated 5 volt DC power is connected to the sensing circuitry 12. Voltage regulator 14 may be one of the 7800 series of three terminal voltage regulators that are well known and available in the prior art. Voltage regulator 14 has a node 22 connected to a ground wire or common 24. The signal appearing at node 26 is the binary output signal. Typically the binary output is a logic level signal that is in a high state for one of two binary conditions of the sensor and in a low state for the other. The diagnostic output signal from the sensing circuit appears at a node 28. The diagnostic signal is also typically a logic level signal that alternates between a low and high state according to either a frequency generated by the sensor circuitry, or a serial data stream representing information generated by the sensor circuitry.

A transistor Q1 is the output transistor of the binary sensor. In the embodiment illustrated in FIG. 1, Q1 is an NPN transistor although it is well known in the art to use a PNP transistor or a field effect transistor (FET) instead. Transistor Q1 conducts when the sensor is in one of its binary states, and does not conduct when the sensor is in the other binary state. The collector of transistor Q1 is connected to a node 30 which in turn is connected to a sensor output terminal 32. The emitter of transistor Q1 is connected to ground or common at node 34. The base of the transistor Q1 is connected at node 36 to the collector of a transistor Q2. A resistor R2 is connected between node 28 and node 36. The base of transistor Q1 is also connected through a resistor R1 to node 30. A pull-up resistor R4 is connected between node 30 and sensor input terminal 18. Resistor R4 is not required but provides a convenient means to measure the voltage at node 30. If used in the circuitry, resistor R4 should be very small compared to resistor R1.

Transistor Q2 has an emitter connected to ground at node 38 and a base connected through a resistor R3 to node 26. Sensor 10 has a common or ground output terminal at 40.

Transistor Q2 and resistors R1 and R2 function to convert the diagnostic output logic level signal at node 28 to a signal superimposed on the sensor output signal appearing at node 30. When the output of sensing circuitry 12 at node 26 is high, the transistor Q2 conducts holding the base of the transitor Q1 at near zero volts. Thus, transistor Q1 does not conduct and there is no signal superimposed on the output signal at node 30.

When the output of sensing circuitry 12 at node 26 is low, transistor Q2 is nonconducting. The current at the base of transistor Q1 is provided either by the current flow through resistor R1 or by the voltage and resulting current from node 28.

When the signal at node 28 is high, which means that no diagnostic information is being sent from sensing circuitry 12, the base current for transistor Q1 is provided by current limiting resistor R2. Transistor Q1 then saturates at a saturation voltage determined by resistor R2, the collector current from transistor Q1 and the gain of transistor Q1. For example, in one embodiment the specifications of the components may be selected to result in a saturation voltage at node 30 of less than 0.3 volts DC.

When the diagnostic signal at node 28 is low, meaning that sensing circuit 12 has transmitted a bit of diagnostic data, the base current for transistor Q1 now comes from resistor R1. This in turn requires that the collector of transistor Q1 rise to a voltage higher than its previous saturation voltage. In operation the collector of transistor Q1 will indeed rise to a voltage such that the signal at node 36 reaches the base-emitter voltage of transistor Q1, which may be, for example, 0.6 volts DC. Because resistors R2 and R1 form a voltage divider, node 30 can be made to rise to any voltage desired above 0.6 volts simply by appropriate choice of the resistance values of resistors R1 and R2. For example, if the resistors R1 and R2 are equal resistance and the signal at node 28 is zero, the signal at node 30 will rise to approximately 1.2 volts (or two times the base to emitter voltage of transistor Q1).

Therefore, while node 26 is low, the output of the binary sensor at node 30 will alternate between about 0.3 volts and 1.2 volts following the diagnostic data stream at node 28. A PLC, smart drop, or other type of logic controller will recognize this as a logic "low", since at either level the signal at node 30 is well below the threshold of the controller input. The controller can be designed, if desired, to monitor the signal at node 30 with a separate circuit that has a threshold of, for example, 0.6 volts DC. This separate circuit would then provide the controller with diagnostic information in addition to the primary binary signal that represents the "on" or "off" state of the sensor.

Figure 2:
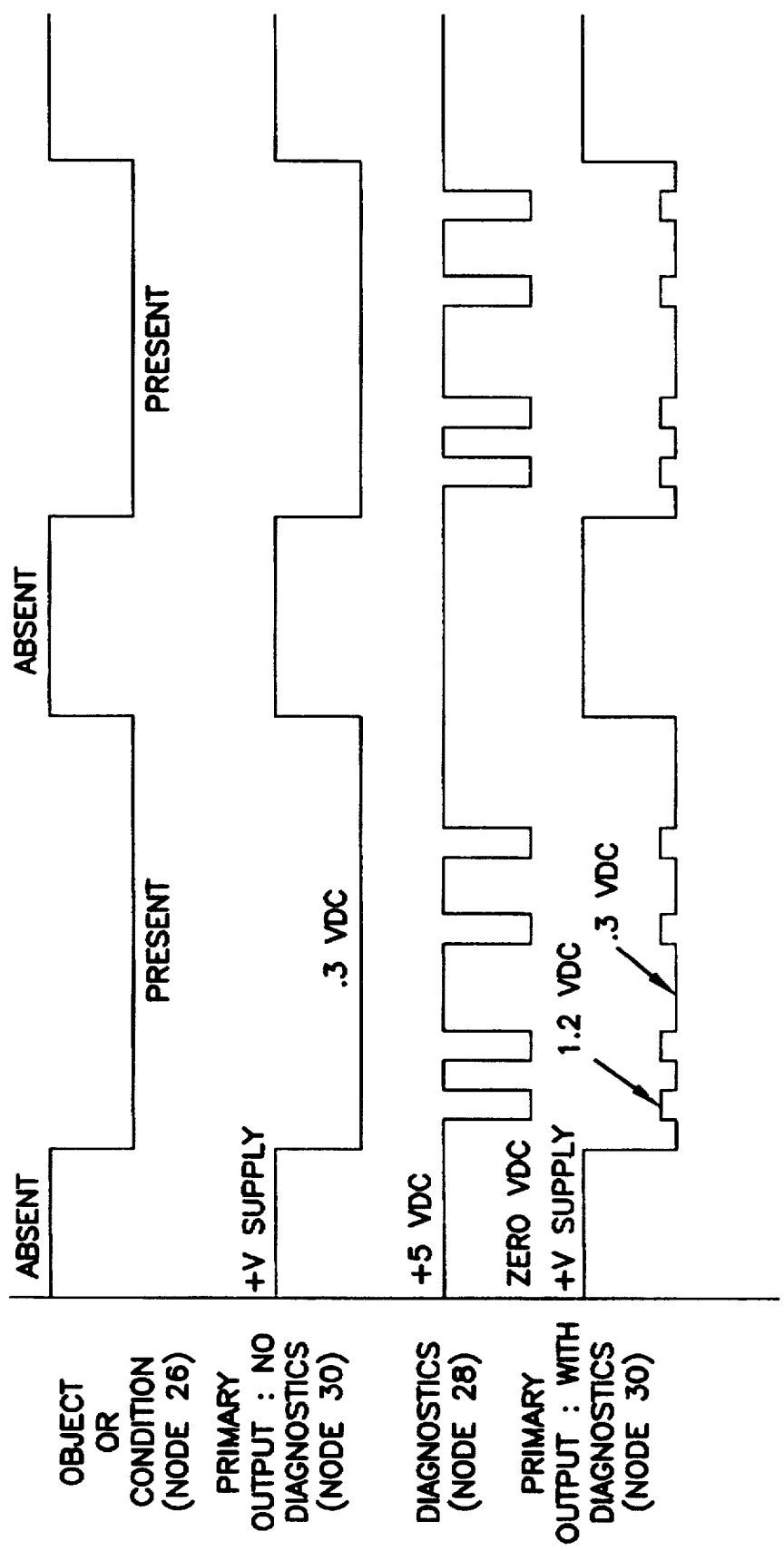
FIG. 2 is a signal timing diagram illustrating the electrical signals at relevant nodes in the circuitry illustrated in FIG. 1.

FIG. 2 depicts a timing diagram of the signals appearing at relevant nodes in the circuit of FIG. 1. The top diagram of FIG. 2 shows the binary signal at node 26 which in the embodiment illustrated detects the absence or presence of an object. The waveform immediately below the top timing diagram in FIG. 2 shows the output at node 30 of binary sensor 10 without the diagnostic circuitry of the present invention. It also illustrates the output at node 30 where sensor 10 has the diagnostic circuitry of the present invention but where there is no diagnostic data being generated by sensing circuitry 12. Under these circumstances the signal at node 30 would alternate between the supply voltage in the non-conducting state of transistor Q1, and a saturation voltage of about 0.3 volts in the conducting state of transistor Q1.

The third waveform in FIG. 2 shows the logic level representation of the diagnostic signal at node 28. This signal may be a constant or a changing frequency, or it may be a data stream represented by logic zeros and logic ones, as is well known in the art. In the embodiment illustrated it is a frequency proportional to the excess gain of a photoelectric sensor as taught in the '393 Patent. As shown the signal at node 28 alternates between 5 volts DC and 0 volts DC.

The bottom waveform in FIG. 2 shows the output at node 30 with the diagnostic signal superimposed on the primary output signal. The signal at node 30 is a signal that is the input to the PLC, smart drop, or other controller. When the object is absent the signal at node 30 is at the supply voltage level. When the object is present the signal at node 30 alternates between 0.3 volts DC and 1.2 volts DC. Thus, this waveform represents the diagnostic signal that is superimposed on the primary binary output of the sensor.

The circuitry illustrated in FIG. 1 and accompanying timing diagrams shown in FIG. 2 represent only one embodiment of the present invention. The same circuit and result can be achieved using a PNP sourcing type of output switching element, a FET, or a solid state output in conjunction with a full rectifier to switch AC signals such as 120 VAC or 240 VAC. It should be apparent that there are other means available in the art to accomplish the function of superimposing the diagnostic signal on the primary output. The objective, in every case, is to superimpose a diagnostic signal that is large enough to recognize, but small enough to be ignored by the relatively high threshold voltage of the controller device to which the binary output signal is an input.

Figure 3:
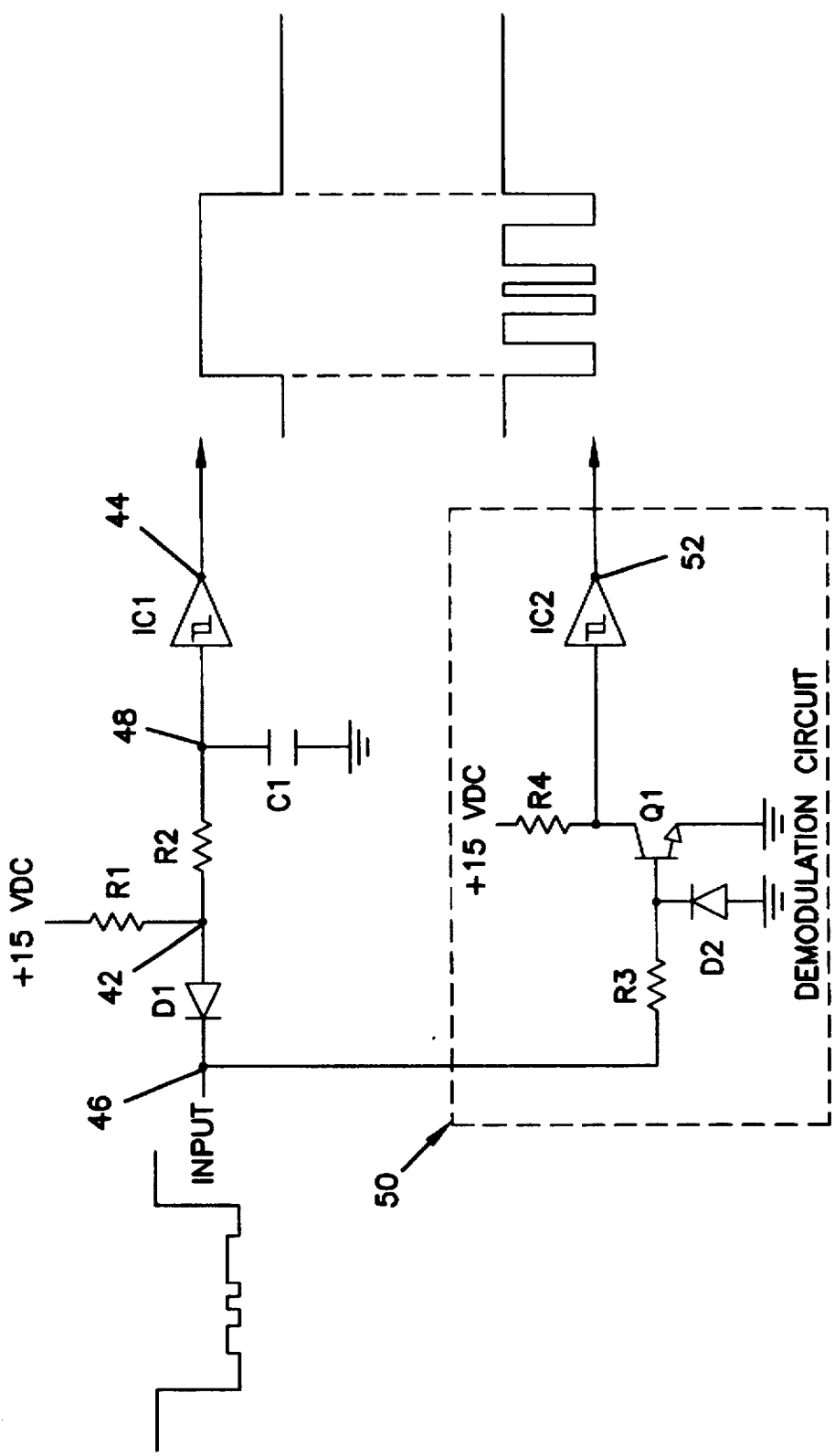
FIG. 3 is a circuit schematic of an input circuit of a PLC with demodulation circuitry for extracting the superimposed diagnostic signal from the binary output signal of the sensor.

FIG. 3 shows an input circuit for a PLC or for the input buffer of a "smart drop". The circuit of FIG. 3 calls for a "sinking" input, in which a low voltage level at the input represents a logic "1" and a high (or no) voltage level at the input represents a logic "0". A diode D1 functions as a blocking diode to protect the input from voltage spikes that rise above the internal supply voltage of the PLC, which in the example shown is 15 VDC. A pullup resistor R1 is connected between the supply voltage and a node 42 to provide a positive voltage for an input register IC1 of the PLC. A resistor R2 is a current limiting resistor connected between node 42 and the input of the IC1. Resistor R2 also functions in combination with a capacitor C1 as a low pass filter to eliminate short duration transient signals from being recognized by IC1. Capacitor C1 is connected between the input of IC1 and ground. The input register IC1 is often simply a Schmitt trigger circuit implemented by using a CMOS IC. Node 44 is the output of input register IC1. A node 46 represents the input to the PLC circuit. A node 48 is the input to the input register IC1. When a high signal or no signal is at node 46, the signal at node 48 goes high and the output signal at node 44 goes low presenting a logic "0" to the PLC's micro controller (not shown). When a current sinking low signal is at node 46, the signal at node 48 goes low and the signal at node 44 goes high presenting a logic "1" to the micro controller.

The amplitude of the signal at node 46 which causes a change in the output of input register IC1 is a function of the Schmitt trigger threshold, which is typically one-half the supply voltage plus or minus 40%. Thus, if the supply voltage to the IC1 is 15 volts, the threshold could be anywhere between 4.5 volts and 10.5 volts. It should be apparent to one skilled in the art that the threshold can be altered with different circuitry, for example by using a voltage divider at input node 46. If the output at the terminal 32 of the circuit in FIG. 1 is connected to the input node 46 of the PLC input circuit of FIG. 3, it can be seen from the timing diagrams in FIG. 2 that the PLC will not recognize the diagnostic signal to cause a change in the logic level output at node 44. This is because the diagnostic signal never rises to more than 1.2 volts. Therefore, the PLC functions as if it were receiving an input signal from a conventional binary sensor that does not include the diagnostic signal.

Returning to FIG. 3, the additional circuitry within the block 50 represents one embodiment of a demodulation circuit. A resistor R3 is a current limiting resistor connected between the input node 46 and the base of a transistor Q1. A diode D2 is connected between the base of transistor Q1 and ground and functions to clamp any negative input voltage spikes thereby protecting the base-emitter junction of transistor Q1. A resistor R4 is connected between the collector of transistor Q1 and the supply voltage of the PLC which in this embodiment is 15 VDC. Resistor R4 functions as a pull-up resistor for transistor Q1. The signal and the collector of transistor Q1 is the input to an input register IC2 which is a CMOS type Schmitt trigger similar to IC1. Input register IC2 has an output node at 52.

When the input signal at node 46 is high transistor Q1 conducts due to the base current through R3 resulting in a logic "0" at the collector output of transistor Q1. Then the output at node 52 of IC2 is a logic "1". This signal is presented to the micro controller of the PLC. When the input signal at node 46 is low, node 46 is at either 0.3 volts or at 1.2 volts, depending on the status of the sensor's diagnostic condition. When the signal is at 0.3 volts there is insufficient base-emitter voltage to cause transistor Q1 to conduct, and the signal at the collector of transistor Q1 is high or a logic "1" and the signal at output node 52 is low or a logic "0". When the signal at node 46 is at 1.2 volts, transistor Q1 conducts and the signal at the collector of transistor Q1 is low or logic "0" and the signal at output node 52 is high or logic "1". As a diagnostic signal is being sent superimposed on the input at node 46, the signal at node 52 follows the action of the sensor's diagnostic data stream when the signal at node 44 remains in the high state.

It is within the ordinary skill in the art to program the PLC to interpret the diagnostic signal as well as the binary state of the sensor. While the embodiment shown in FIGS. 1 and 3 only presents diagnostic data during the time that the sensor output is low, it is also contemplated that the present invention would include suitable sensor circuitry and demodulation circuitry to provide the diagnostic data during the time that the sensor output is high. The binary sensor circuitry of the present invention could also be designed to transmit the superimposed diagnostic signal when the sensor output at terminal 32 is high and when it is low. In order to do this a PNP circuit similar to the circuit of transistor Q1, transistor Q2, resistor R1, resistor R2 and resistor R3 and resistor R4 is simply inserted in lieu of resistor R4 so that the output at terminal 32 becomes a "push-pull" output as is well known in the art.

The binary sensor of the present invention can also be designed as a 2-wire device as is well known in the binary sensor art. For examples of such sensors see U.S. Pat. No. 5,254,846. Moreover, while in the embodiment disclosed herein the diagnostic signal is described as the Excess Gain or signal strength, it should also be understood that other diagnostic data could be superimposed on the primary binary output. Additional examples of diagnostic information include, but are not limited to, a sensor identification number, temperature, sensor distance to the object, and a general alarm indicating a malfunction of the sensor.

As previously mentioned the present invention contemplates a binary sensor that functions according to any one of the well known principles such as photoelectric, inductive, ultrasonic, and capacitive. The present invention also contemplates that the diagnostic data signal could be generated by know principles in any one of a number of formats such as serial data, frequency, and pulse width modulation as examples, but not necessarily limiting examples. The primary requirement of the superimposed diagnostic signal is that it is large enough to be recognized but small compared to the controller threshold.

It should also be appreciated that a binary sensor according to the present invention can be utilized without using the diagnostic feature. Unless the demodulation circuitry such as shown in FIG. 3 is incorporated into the controller the output of the binary sensor of the present invention will simply appear to the controller as a conventional binary sensor output. In other words the controller has to look for and detect the superimposed diagnostic signal in order to utilize the information contained therein.

I claim:

1. A binary sensor comprising:
   means for detecting the presence or condition of an object;
   circuit means connected to said detecting means for generating a binary output signal representing the presence or condition of an object;
   circuit means for generating a diagnostic signal associated with said binary sensor;
   means for superimposing said diagnostic signal on said binary output signal.

2. A binary sensor in accordance with claim 1 wherein said binary output signal is intended as the input to a device having a predetermined input amplitude threshold, said binary output signal having an amplitude exceeding said predetermined input amplitude and said diagnostic signal having an amplitude substantially less than said predetermined input amplitude threshold.

3. A binary sensor comprising:
   means for detecting the presence or condition of an object;
   circuit means connected to said detecting means for generating a binary output signal representing the presence or condition of an object;
   circuit means for generating a modulated diagnostic signal associated with said binary sensor;
   means for superimposing said modulated diagnostic signal on said binary output signal whereby said modulated diagnostic signal and said binary output signal are simultaneously transmitted.

4. A method of monitoring the operation of a binary sensor having a binary output representing the presence or condition of an object comprising the steps of:
   generating a diagnostic signal representing a condition of operation of said binary sensor;
   superimposing said diagnostic signal on the binary output;
   detecting said diagnostic signal; and
   interpreting said diagnostic signal.

5. A method in accordance with claim 4 wherein said step of generating a diagnostic signal further comprises the step of generating a modulated diagnostic signal.

6. A method in accordance with claim 5 wherein the step of detecting said diagnostic signal further comprises the step of demodulating said modulated diagnostic signal.

* * * * *